(12) United States Patent
Kaneko et al.

(10) Patent No.: US 11,374,225 B2
(45) Date of Patent: Jun. 28, 2022

(54) ELECTRODE PLATE, ENERGY STORAGE DEVICE, AND METHOD FOR MANUFACTURING ELECTRODE PLATE

(71) Applicant: GS Yuasa International Ltd., Kyoto (JP)

(72) Inventors: Ryosuke Kaneko, Kyoto (JP); Masashi Demizu, Kyoto (JP); Tetsuya Murai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 38 days.

(21) Appl. No.: 16/753,599

(22) PCT Filed: Oct. 6, 2017

(86) PCT No.: PCT/JP2017/036508
§ 371 (c)(1),
(2) Date: Apr. 3, 2020

(87) PCT Pub. No.: WO2019/069459
PCT Pub. Date: Apr. 11, 2019

(65) Prior Publication Data
US 2020/0335793 A1 Oct. 22, 2020

(51) Int. Cl.
*H01M 4/62* (2006.01)
*H01M 4/02* (2006.01)

(52) U.S. Cl.
CPC .......... *H01M 4/624* (2013.01); *H01M 4/621* (2013.01); *H01M 2004/021* (2013.01)

(58) Field of Classification Search
None
See application file for complete search history.

(56) References Cited

U.S. PATENT DOCUMENTS

| | | |
|---|---|---|
| 2002/0168569 A1 | 11/2002 | Barriere et al. |
| 2006/0269842 A1 | 11/2006 | Ichinose et al. |
| 2009/0197181 A1 | 8/2009 | Sakitani et al. |
| 2010/0190064 A1 | 7/2010 | Ikeda et al. |
| 2013/0260207 A1 | 10/2013 | Uemura |
| 2014/0295263 A1 | 10/2014 | Iwama et al. |
| 2016/0240839 A1 | 8/2016 | Umeyama et al. |

FOREIGN PATENT DOCUMENTS

| | | |
|---|---|---|
| EP | 2685525 A1 | 1/2014 |
| EP | 2816645 A1 | 12/2014 |
| EP | 2950369 A2 | 12/2015 |
| JP | 2004-265874 A | 9/2004 |
| JP | 2006-185887 * | 7/2006 |
| JP | 2007-12598 A | 1/2007 |
| JP | 2007-35541 A | 2/2007 |
| JP | 2007-35543 A | 2/2007 |
| JP | 2007-35544 A | 2/2007 |
| JP | 2007-35554 A | 2/2007 |
| JP | 2007-35555 A | 2/2007 |
| JP | 2008-53207 A | 3/2008 |
| JP | 2008-198463 A | 8/2008 |
| JP | 4449164 B2 | 4/2010 |
| JP | 2010-176996 A | 8/2010 |
| JP | 2013-222581 A | 10/2013 |
| JP | 2014-191912 A | 10/2014 |
| JP | 2015-88385 A | 5/2015 |
| JP | 2015-232930 A | 12/2015 |
| JP | 2016-152066 A | 8/2016 |
| WO | 2012/081543 A1 | 6/2012 |
| WO | 2014/112329 A1 | 7/2014 |
| WO | 2014/185006 A1 | 11/2014 |
| WO | 2014/203767 A1 | 12/2014 |
| WO | 2017/138116 A1 | 8/2017 |

OTHER PUBLICATIONS

Method of Particle-size Evaluation of Ground Material, published on May 31, 2018, available at https://www.thinkymixer.com/en-gl/en-gl/library/report/method-of-particle-seze-evaluation-of-ground-material/ (Year: 2018).*
Machine translation of JP 2006-185887, published on Jul. 13, 2006 (Year: 2006).*
International Search Report (ISR) dated Dec. 19, 2017 filed in PCT/JP2017/036508.

* cited by examiner

*Primary Examiner* — Anca Eoff
(74) *Attorney, Agent, or Firm* — Rankin, Hill & Clark LLP

(57) ABSTRACT

In an electrode having a covering layer stacked on a composite layer, an increase in resistance of the electrode is suppressed. An electrode plate includes a composite layer including active material particles and a covering layer including filler particles stacked on the composite layer. In this electrode plate, a particle size (D30) of the active material particle is set to be equal to or smaller than a particle size (D50) of the filler particle.

6 Claims, 5 Drawing Sheets

ELECTRODE PLATE, ENERGY STORAGE DEVICE, AND METHOD FOR MANUFACTURING ELECTRODE PLATE

CROSS-REFERENCE TO RELATED APPLICATIONS

This application is a National Phase Application of International Application No. PCT/JP2017/036508, filed Oct. 6, 2017.

TECHNICAL FIELD

The technology disclosed in the present specification relates to an electrode plate, an energy storage device using the electrode plate, and a method for manufacturing an electrode plate.

BACKGROUND ART

Conventionally as a technique of improving safety of an energy storage device, a technique of forming a covering layer on a surface of an electrode plate is known (JP-A-2008-53207). In this patent document, a covering layer containing magnesia (MgO) as filler particles is formed on a surface of a positive active material layer (see paragraph 0084).

PRIOR ART DOCUMENT

Patent Document

Patent Document 1: JP-A-2008-53207

SUMMARY OF THE INVENTION

Problems to be Solved by the Invention

In the above technique, a slurry is prepared by mixing magnesia filler particles with a binder in a solvent. This slurry is applied onto an electrode plate, and the solvent is removed, whereby a covering layer is formed on a surface of a positive electrode. In this case, when filler particles having a relatively small particle size are used, there is a concern that the filler particles may enter a composite layer formed in the electrode plate. When the filler particles enter the composite layer, an electric resistance value of the composite layer may increase.

The technique disclosed in the present specification has been completed based on the circumstances as described above, and has an object to suppress an increase in resistance of an electrode plate.

Means for Solving the Problems

An electrode plate according to an aspect of the technology disclosed in the present specification includes a composite layer including active material particles, and a covering layer including filler particles stacked on the composite layer, and the active material particle has a particle size (D30) equal to or smaller than a particle size (D50) of the filler particle.

Advantages of the Invention

According to the technology disclosed in the present specification, it is possible to suppress an increase in resistance of the electrode plate.

Figure 1:
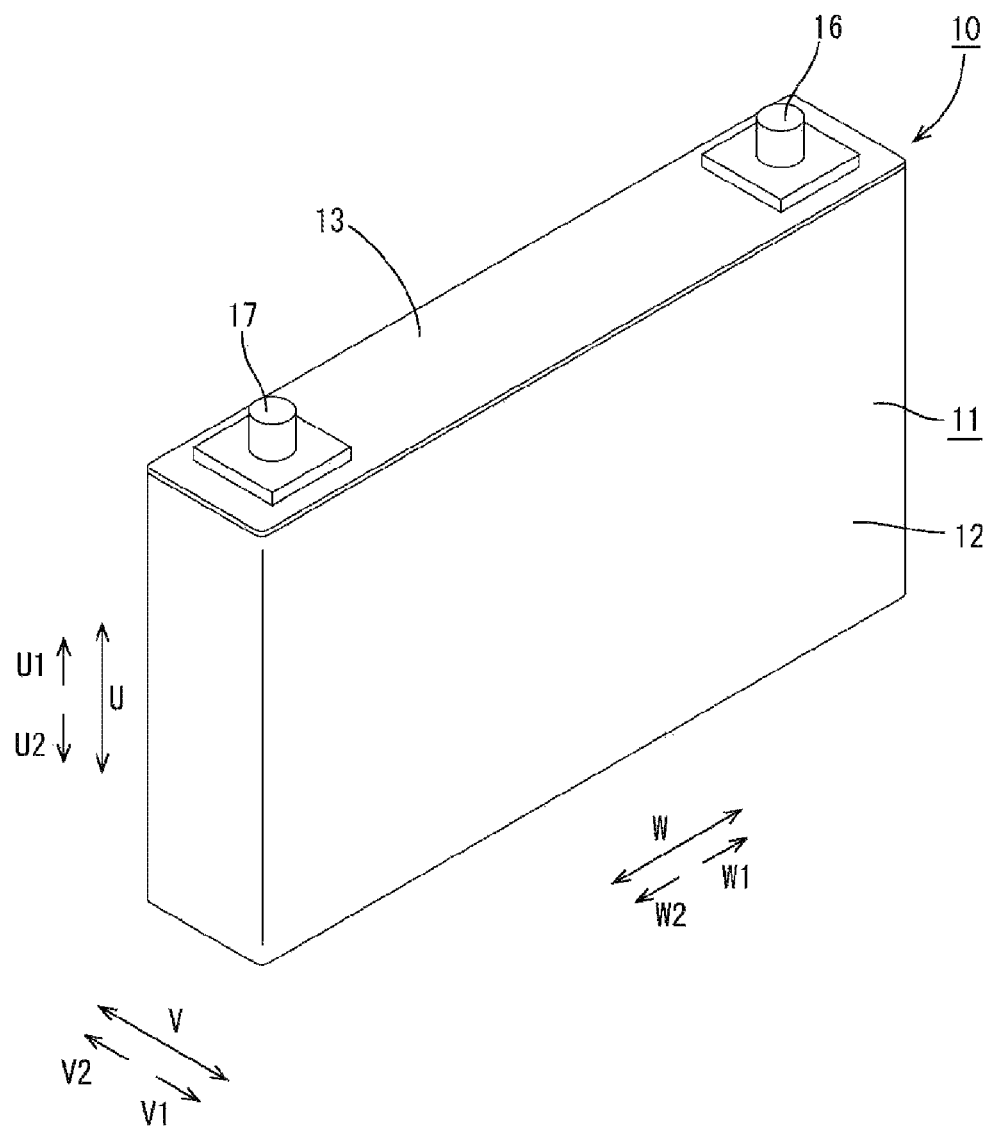
FIG. 1 is a perspective view showing an energy storage device according to Embodiment 1.

MODE FOR CARRYING OUT THE INVENTION (Outline of Embodiment)

An outline of the technology disclosed in the present embodiment will be described. An electrode plate according to the present embodiment includes a composite layer including active material particles, and a covering layer including filler particles stacked on the composite layer, and the active material particles have a particle size (D30) equal to or smaller than a particle size (D50) of the filler particles.

According to the above configuration, the filler particles are larger than a size of a void between the active material particles in the composite layer. As a result, entry of the filler particles into the composite layer is suppressed. This makes it difficult to hinder permeation of an electrolyte into the composite layer, and an increase in resistance, in particular, an increase in DC resistance can be suppressed.

A particle size ratio (active material particle size (D30)/filler particle size (D50)) of the particle size (D30) of the active material particle to the particle size (D50) of the filler particle is preferably 0.2 or more. According to this configuration, it is possible to suppress a decrease in energy density of an energy storage device due to thickness of the covering layer.

In one aspect of the present embodiment, an electrode plate in which the active material particles are positive active material particles is preferable. According to this configuration, even when impurities such as metals are mixed in the energy storage device, contact between a positive composite layer and the impurities can be prevented, so that it is possible to suppress such a minute short circuit that degrades the performance of the energy storage device.

In one embodiment of the technology disclosed in the present specification, the covering layer is preferably formed by dry coating. According to this configuration, an increase in resistance of the energy storage device can be further suppressed.

Embodiment 1

Embodiment 1 of the technology disclosed in the present specification will be described with reference to FIGS. 1 to 5. An energy storage device 10 according to Embodiment 1 is used, for example, as a power source of a vehicle (not shown) such as an electric vehicle or a hybrid vehicle, or as a power source of a power tool (not shown). FIG. 5 shows an energy storage apparatus 60 including a plurality of the energy storage devices 10 described above. In FIG. 5, the energy storage apparatus 60 includes a plurality of energy storage units 50.

The energy storage device 10 according to Embodiment 1 is a lithium ion battery that is a nonaqueous electrolyte secondary battery and houses a positive electrode plate 18 (an example of an electrode plate), a negative electrode plate 19 (an example of a counter electrode plate), a separator 21 and a nonaqueous electrolyte (not shown) within a case 11.
(Case 11)

As shown in FIG. 1, the case 11 is made of metal and has a flat rectangular parallelepiped shape. On an upper surface of the case 11, a positive electrode terminal 16 and a negative electrode terminal 17 are provided to protrude upward. The positive electrode terminal 16 and the negative electrode terminal 17 are electrically connected respectively to the positive electrode plate 18 and the negative electrode plate 19 in the case 11 by a known method.
(Energy Storage Element 20)

Figure 2:
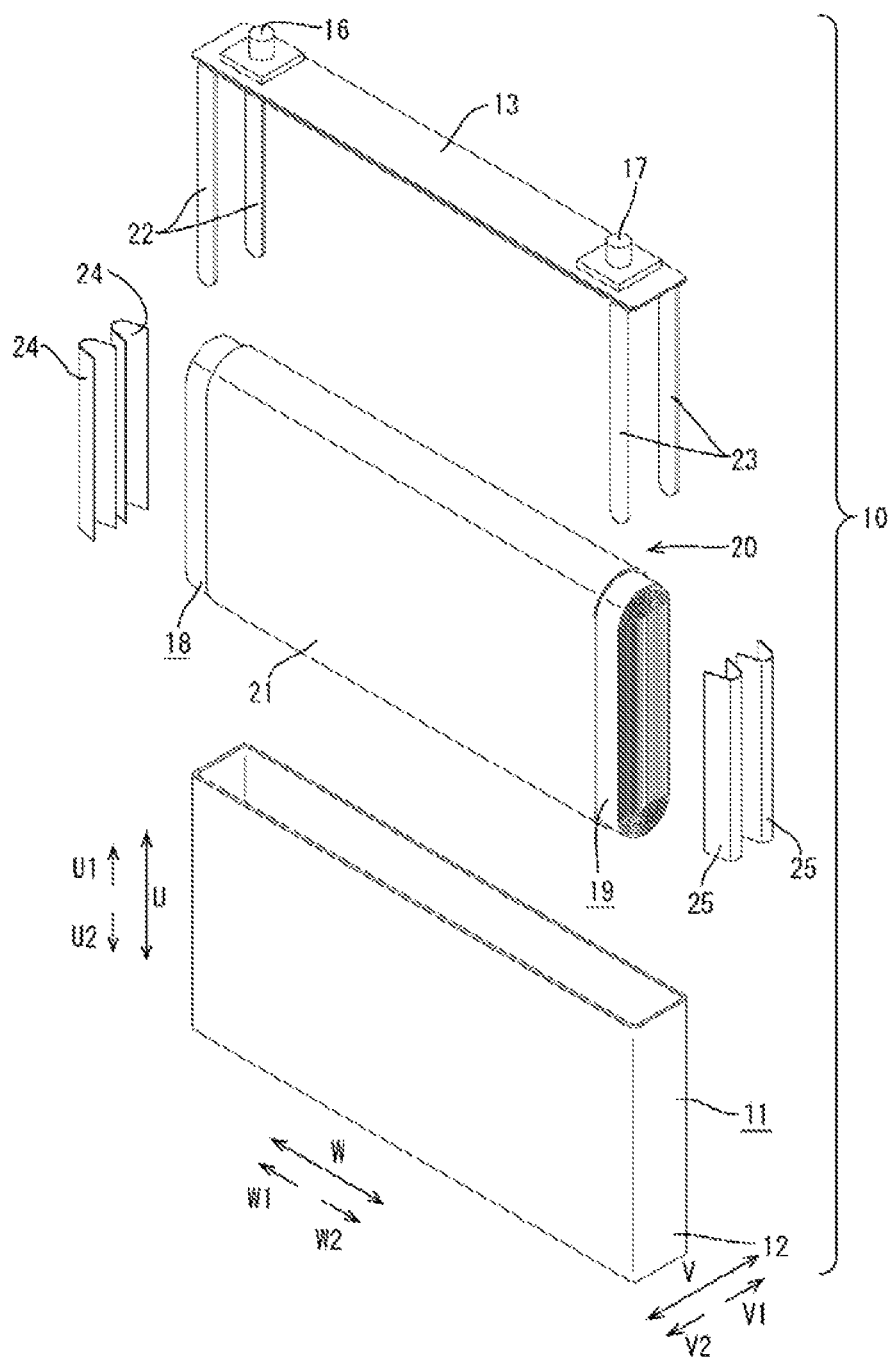
FIG. 2 is an exploded perspective view showing the energy storage device.
Figure 3:
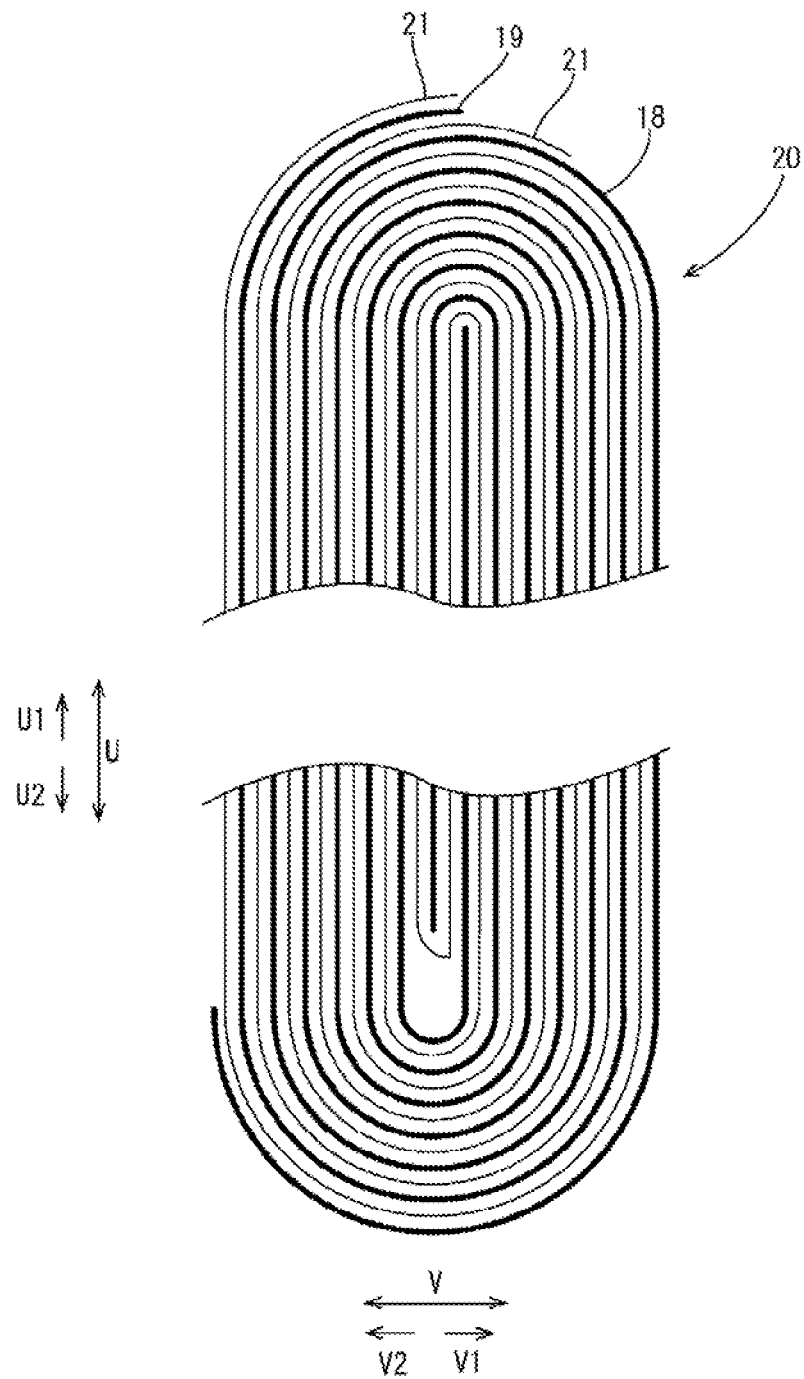
FIG. 3 is a partially cutaway side view showing an energy storage element.

As shown in FIG. 2, the case 11 houses an energy storage element 20 therein. The case 11 has a case body 12 and a lid 13. The lid 13 is provided with the positive electrode terminal 16, the negative electrode terminal 17, a positive electrode current collector 22, and a negative electrode current collector 23. As shown in FIG. 3, the energy storage element 20 is manufactured by winding the positive electrode plate 18 and the negative electrode plate 19 with the separator 21 interposed between these plates.

The positive electrode current collector 22 and a positive electrode current collecting substrate 30 to be described later are ultrasonically welded while being sandwiched by a clip 24, so that the positive electrode terminal 16 and the positive electrode plate 18 are electrically connected. Similarly, the negative electrode terminal 17 and the negative electrode plate 19 are electrically connected.
(Positive Electrode Plate 18)

The positive electrode current collecting substrate 30 has a metal foil or plate shape. The positive electrode current collecting substrate 30 according to the present embodiment is made of aluminum or an aluminum alloy. The positive electrode current collecting substrate 30 preferably has a thickness of 5 μm or more and 50 μm or less.

On one surface or both surfaces of the positive electrode current collecting substrate 30, a positive composite layer 31 (an example of a composite layer) including positive active material particles 40 (an example of the active material particles) is formed. In the present embodiment, the positive composite layers 31 are formed on both surfaces of the positive electrode current collecting substrate 30. A positive composite may contain a conductive auxiliary and a binder in addition to the positive active material particles 40.

As the positive active material particles 40, a known material can be used as appropriate as long as the positive active material particles 40 can insert and extract lithium ions. For example, as the positive active material, a polyanion compound such as $LiMPO_4$, $Li_3M_2(PO_4)_3$, $Li_2MPO_4F$, $Li_2MSiO_4$, or $LiMBO_3$ (M is one or two or more transition metal elements selected from V, Ti, Fe, Ni, Mn, Co, Cu, etc.), a compound having a spinel-type crystal structure such as lithium manganese oxide, a lithium transition metal oxide represented by a general formula $Li_xMO_2$, or $Li_{1+y}M_{1-y}O_2$ (M is one or two or more transition metal elements selected from Fe, Ni, Mn, Co, etc., $0<x\leq1.2$, $0<y<1$), or the like can be used.

Among the above materials, an energy storage device using a lithium transition metal composite oxide as a main component of the positive active material is preferable because it has an excellent balance of energy density, charge-discharge characteristics, and life characteristics such as high-temperature storage. It is preferable that a ratio of the number of moles of nickel to the number of moles of transition metal is larger, because an increase in DC resistance before and after storage of the energy storage device at a high temperature can be further suppressed. Thus, the ratio of the number of moles of nickel contained in the lithium transition metal composite oxide preferably exceeds 30%, more preferably 33% or more, based on the number of moles of the transition metal. On the other hand, when the ratio of the number of moles of nickel to the number of moles of transition metal in the lithium transition metal composite oxide exceeds 80%, an initial coulomb efficiency of the lithium transition metal composite oxide tends to decrease. The use of the lithium transition metal composite oxide as a main component of the positive active material means that the mass of the lithium transition metal composite oxide is the largest in the total mass of the positive active material.

From these viewpoints, the ratio of the number of moles of nickel to the number of moles of transition metal in the lithium transition metal composite oxide is preferably more than 30%, more preferably 33% or more, and particularly preferably 33% to 80%. Most preferably a lithium transition metal composite oxide represented by the formula $Li_wNi_xMn_yCo_zO_2$ ($0<w\leq1.2$, $0.3\leq x\leq0.5$, $0\leq y<1$, $0.3\leq z\leq0.5$) is used as the positive active material.

The type of the conductive auxiliary is not particularly limited, and a carbon material such as graphite, carbon black, acetylene black, or Ketjen black can be used.

The type of the binder is not particularly limited as long as the binder is stable with respect to the solvent and the electrolyte used in producing the electrode. For example, thermoplastic resins such as polytetrafluoroethylene (PTFE), polyvinylidene fluoride (PVDF), polyethylene, and polypropylene; polymers having rubber elasticity such as styrene butadiene rubber (SBR) and fluororubber, and the like can be used as one or two or more mixtures. If necessary a viscosity modifier and the like may be contained in the positive composite. As the viscosity modifier, any compound such as carboxymethylcellulose (CMC) can be appropriately selected as needed.

Figure 4:
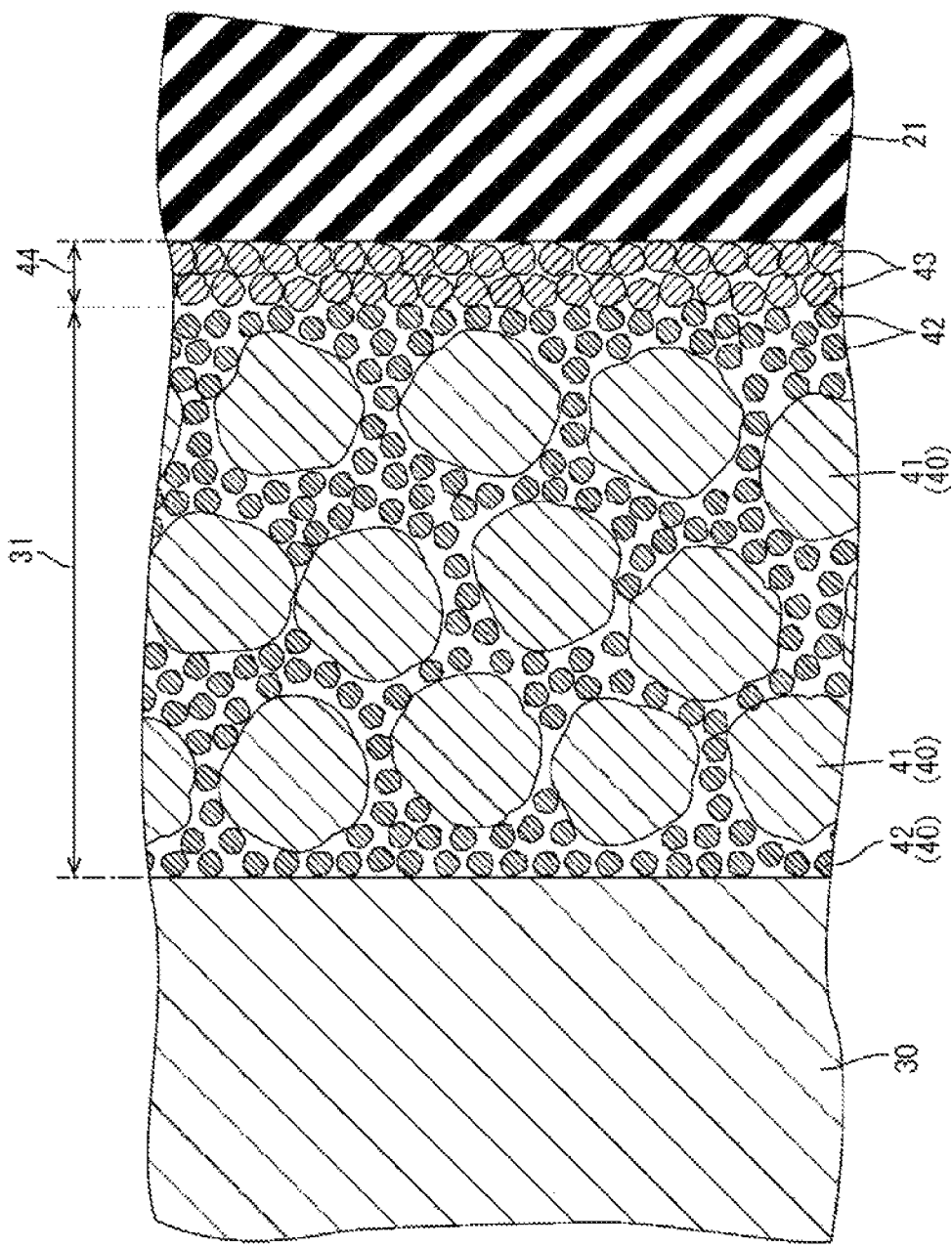
FIG. 4 is a partially enlarged cross-sectional view showing a positive electrode current collecting substrate, a positive composite layer, a covering layer, and a separator.
Figure 5:
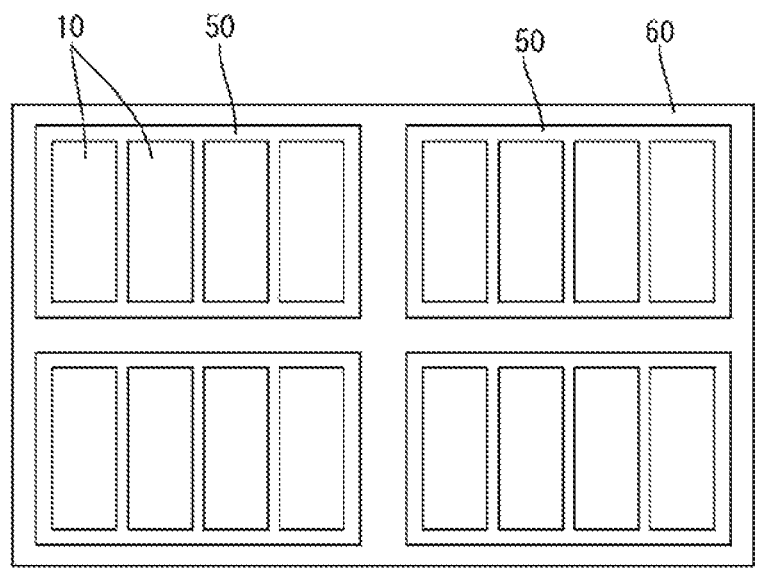
FIG. 5 is a schematic view showing an energy storage module including the energy storage device.

As shown in FIG. 4, a covering layer 44 containing filler particles 43 and a binder is formed on a surface of the positive composite layer 31. The filler particles 43 are preferably electrically insulating from the viewpoint of safety of the energy storage device. The filler particles 43 preferably have a weight loss of 5% or less at 500° C. in the atmosphere. The filler particles 43 particularly preferably have a weight loss of 5% or less at 800° C. Such materials include inorganic compounds. The inorganic compound is an inorganic material of more than one of a single component selected from the following, a compound of more than one of the following, or a composite compound of more than one of the following: oxide particles such as an iron oxide, $SiO_2$, $Al_2O$, $TiO_2$, $BaTiO_2$, $ZrO$, or an alumina-silica composite oxide or the like; nitride particles such as aluminum nitride or silicon nitride or the like; insoluble ionic crystal particles of calcium fluoride, barium fluoride, or barium sulfate or the like; covalent crystal particles of silicon or diamond or the like; clay particles of talc or montmorillonite or the like; and synthetic material of or material derived from mineral resources such as boehmite, zeolite, appetite, kaolin, mullite, spinel, olivine, sericite, bentonite, or mica or the like.

The shape of the filler particles can be selected according to the required battery performance. For example, the filler particles 43 may have various shapes such as a spherical shape, a scale shape, and a tetrapod shape.

When an aspect ratio of the filler particles 43 is 1.5 or less, permeation of an electrolyte is less likely to be hindered by the covering layer, so that an increase in resistance of an electrode plate can be suppressed. On the other hand, when the filler particles 43 are scaly (aspect ratio being 2 or more), since the filler particles 43 of the covering layer can efficiently cover a surface of the composite layer, the thickness of the covering layer can be reduced. Secondary particles in which primary particles are aggregated can be used as the filler particles 43. When the filler particles 43 are the secondary particles in which the primary particles are aggregated, the electrolyte solution permeates between the primary particles, so that even if the filler particles 43 are arranged between the active materials on the surface of the composite layer, permeability of the electrolyte solution can be secured.

The type of the binder in the covering layer is not particularly limited as long as the binder is a material which is stable with respect to the electrolyte. Examples of the binder include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl acrylate, polymethyl methacrylate, polyacrylic acid, polymethacrylic acid, styrene-butadiene rubber, nitrile-butadiene rubber, polystyrene, and polycarbonate. From the viewpoint of electrochemical stability, polyacrylonitrile, polyvinylidene fluoride, polyhexafluoropropylene or polyethylene oxide is more preferable. In particular, polyvinylidene fluoride, polyacrylic acid, polymethacrylic acid, and styrene-butadiene rubber are preferable.

The content of the binder in the covering layer is 3 to 35 parts by weight, more preferably 5 to 20 parts by weight, based on the total weight of the filler particles and the binder.

(Negative Electrode Plate 19)

A negative electrode current collecting substrate (not shown) has a metal foil or plate shape. The negative electrode current collecting substrate according to the present embodiment is made of copper or a copper alloy. The negative electrode current collecting substrate preferably has a thickness of 5 μm or more and 50 μm or less.

A negative composite layer (not shown) containing a negative active material is formed on one or both surfaces of the negative electrode current collecting substrate. In the present embodiment, the negative composite layers are formed on both surfaces of the negative electrode current collecting substrates. A negative composite may contain a negative active material, a conductive auxiliary and a binder. Descriptions of a binder, a viscosity modifier, and the like that can be used for the negative electrode plate 19 will be omitted because it is possible to appropriately select and use the same ones that can be used for the positive electrode plate 18.

Examples of the negative active material include carbon materials, elements that can be alloyed with lithium, alloys, metal oxides, metal sulfides, and metal nitrides. Examples of the carbon material include hard carbon, soft carbon, and graphite. These may be included alone or in combination of two or more.

(Separator 21)

As the separator 21, a known one can be used as appropriate. For example, it is possible to use a separator composed of only a substrate layer, or a separator in which an inorganic layer containing heat-resistant particles and a binder is formed on one or both surfaces of the substrate layer. As the substrate layer of the separator 21, polyethylene, polypropylene, or a composite film thereof can be used.

(Electrolyte)

The electrolyte is not limited, and those that are generally proposed to be used in lithium ion batteries and the like can be used. Examples of the nonaqueous solvent may include, but are not limited to, cyclic carbonate esters such as propylene carbonate, ethylene carbonate, butylene carbonate, chloroethylene carbonate and vinylene carbonate; cyclic esters such as γ-butyrolactone and γ-valerolactone; and chain carbonates such as dimethyl carbonate, diethyl carbonate and ethylmethyl carbonate alone, or mixtures of two or more thereof. A known additive may be added to the electrolyte.

Examples of the electrolyte salt include inorganic ion salts including one of $LiClO_4$, $LiBF_4$, $LiAsF_6$, and $LiPF_6$; and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2FSO_2)_3$, and these ionic compounds can be used alone or in combination of two or more thereof.

(Positive Composite Layer 31)

As shown in FIG. 4, the positive composite layer 31 is formed on the surface of the positive electrode current collecting substrate 30. The positive composite layer 31 contains the positive active material particles 40. In the present embodiment, a particle size (D30) of the positive active material particles 40 is preferably 0.1 μm to 30 μm, more preferably 0.5 μm to 20 μm, and particularly preferably 1 μm to 10 μm.

The covering layer 44 containing the filler particles 43 and a binder is formed on the surface of the positive composite layer 31, and the particle size (D3) of the positive active material particles 40 is equal to or smaller than a particle size (D50) of the filler particles 43.

For the particle size (D30) of the positive active material particles 40 and the particle size (D50) of the filler particles 43, a particle size distribution of the positive active material particles 40 and a particle size distribution of the filler particles 43 were measured using a laser diffraction type particle size distribution measuring device (device name: SALD-2200 (manufactured by Shimadzu Corporation), measurement control software was WingSALD-2200).

A scattering measurement mode was used for the measurement. When the particle size of the positive active material particles 40 was measured, a dispersion was prepared by dispersing the positive active material particles 40 in a dispersion solvent, and this dispersion was used as a measurement sample. On the other hand, when the particle size of the filler particles 43 was measured, a dispersion was prepared by dispersing the filler particles 43 in a dispersion solvent, and this dispersion was used as a measurement sample. A measurement wet cell containing the above dispersion is placed in an ultrasonic environment for 5 minutes and then set in the device, and the measurement is performed by applying laser light to obtain a scattered light distribution. The obtained scattered light distribution was approximated by a log normal distribution. In a range where the minimum was set to 0.1 μm and the maximum was set to 100 μm in the particle size distribution (horizontal axis, σ), the particle size corresponding to a degree of accumulation of 30% was defined as D30, and the particle size corresponding to a degree of accumulation of 50% was defined as D50.

As the particle size of the positive active material, a value obtained by rounding off the first decimal place of the particle size corresponding to a degree of accumulation of 30% was adopted as D30. As the particle size of the filler particles, a value obtained by rounding off the first decimal place of the particle size corresponding to a degree of accumulation of 50% was used as D50. When the measured value was smaller than 1 μm, a value obtained by rounding off the second decimal place was used. As a specific example, for example, "0.82 μm" was changed to "0.8 μm".

In the present embodiment, as the particle size of the positive active material particles 40, so-called D30 corresponding to a degree of accumulation of 30% was used. This is for the following reason. In the technology disclosed in the present specification, attention is paid to a relationship of the particle size at a boundary between the surface of the positive composite layer 31 and the covering layer 44. Among the positive active material particles 40 included in the positive composite layer 31, relatively small particles float toward the surface of the positive composite layer 31 after the positive composite is applied to the positive electrode substrate. As a result, particles smaller than D50 tend to collect on the surface of the positive composite layer 31. That is, a gap between the particles near the surface of the positive composite layer 31 tends to be larger than in a case where the positive active material particles 40 are uniformly applied. Thus, D30 was used as the particle size of the positive active material particles 40 in an appropriate relationship between the particle size of the positive active material particles 40 and the particle size of the filler particles 43 on the surface of the positive composite layer 31. In the technology disclosed in the present specification, when the positive composite layer 31 is equally divided in the thickness direction, the effect becomes larger when a density of the positive active material particles 40 on the surface side is smaller than a density of the positive active material 40 on the substrate side.

Covering layer 44

The covering layer 44 is formed on the surface of the positive composite layer 31. The covering layer 44 contains the filler particles 43. The particle size (D50) of the filler particles 43 is equal to or larger than the particle size (D30) of the positive active material particles 40. This suppresses entry of the filler particles 43 into a gap between the positive active material particles 40. As a result, entry of the filler particles 43 in the covering layer 44 into the positive composite layer 31 is suppressed. This makes it difficult to hinder permeation of an electrolyte solution into the positive composite layer 31, so that an increase in an electric resistance value of the positive composite layer 31 can be suppressed.

Since the covering layer 44 is formed on the surface of the positive composite layer 31, even if impurities such as metals are mixed in the energy storage device, contact between the positive composite layer and the impurities can be prevented. The contact between the positive composite layer and a metal may cause a micro short circuit between the positive electrode plate and the negative electrode plate. Since, the presence of the covering layer 44 on the surface of the positive composite layer 31 is preferable because a minute short circuit of the energy storage device can be suppressed.

Setting a particle size ratio (active material particle size (D30)/filler particle size (D50)) of the particle size (D30) of the positive active material particles 40 to the particle size (D50) of the filler particles 43 to 0.9 or less is preferable because entry of the filler particles 43 into the positive composite layer 31 is further suppressed. The particle size ratio is more preferably 0.7 or less.

On the other hand, employing an active material particle size smaller than the preferable range of the particle size of the positive active material particles 40 is technically difficult in many aspects from the viewpoint of production of the active material and performance of the energy storage device. Therefore, when the active material particle size (D30)/filler particle size (D50) is reduced, the filler particle size tends to increase. As the filler particle size increases, the thickness of the covering layer also increases. When the thickness of the covering layer increases to increase the volume of the positive electrode plate, the energy density of the energy storage device may decrease. Thus, in order to maintain the energy density of the energy storage device, it is preferable that the active material particle size (D30)/filler particle size (D50) is not unnecessarily reduced. Specifically, the active material particle size (D30)/filler particle size (D50) is preferably 0.2 or more. The active material particle size (D30)/filler particle size (D50) is more preferably 0.4 or more.

When large-diameter active material particles 41 and small-diameter active material particles 42 described later are mixed as the positive active material particles 40, a ratio of a small-diameter active material particle size (D30)/filler particle size (D50) is preferably in the above range instead of the active material particle size (D30)/filler particle size (D50).

The covering layer 44 is preferably provided on the entire surface of the positive composite layer 31. With this configuration, even when the separator 21 is blown, the covering layer 44 has a role of preventing the positive composite layer 31 and the negative composite layer from directly contacting each other. When the positive composite layer 31 and the negative active material layer are in contact with each other with the covering layer 44 interposed between these layers, it is necessary to suppress a short-circuit current between the positive and negative electrodes to an extent that safety of the energy storage device can be ensured. Thus, it is preferable that electric resistance of the covering layer 44 is larger, and it is more preferable that the covering layer 44 is infinitely electrically insulating. In the present embodiment, since entry of the filler particles 43 into the positive composite layer 31 is suppressed, most of the filler particles 43 are held in the covering layer 44 formed on the surface of the positive composite layer 31. As a result, an electric resistance value of the covering layer 44 is suppressed from being smaller than a predetermined value.

The particle size (D50) of the filler particles 43 is preferably 0.1 μm to 20 μm, more preferably 0.5 μm to 15 μm, and particularly preferably 1 Jim to 10 μm.

The filler particles 43 may be composed of a plurality of filler particles having different particle sizes (D50), in which case it suffices that the particle size (D50) of the smallest filler particle is equal to or larger than the particle size (D30) of the positive active material particles 40. In this case, for the particle size (D50) of the smallest filler particle, the value of D50 calculated from data on the side with the smallest particle size at a maximum point in a frequency distribution graph obtained by measuring the particle size distribution of the filler particles 43 using a laser diffraction type particle size distribution measuring device is used as the filler particle size (D50).

When a plurality of filler particles having different particle sizes (D50) are used as the filler particles 43, a particle size ratio (F2/F1) of a particle size F2 (D50) of the largest filler particle to a particle size F1 (D50) of the smallest filler particle is preferably 3 or less. Thereby, it is possible to suppress entry of the filler particles having a small particle size into a gap between the filler particles having a large particle size. As a result, permeation of the electrolyte solution in the covering layer is less likely to be hindered, so that high rate discharge performance of the energy storage device can be maintained, which is preferable. More preferably, F2/F1 is 2 or less.

In the present embodiment, entry of the filler particles 43 in the covering layer 44 into the positive composite layer 31 is suppressed. Thus, it is considered that the safety of the energy storage device can be ensured even if the covering layer is thinned to some extent. Thinning the covering layer is preferable because the high rate discharge performance of the energy storage device can be maintained. Specifically, the thickness of the covering layer 44 is preferably 30 μm or less, and particularly preferably 15 μm or less. On the other hand, if the covering layer is too thin, a margin of safety of the energy storage device may be reduced. Therefore, the thickness of the covering layer is preferably 0.5 μm or more. The thickness of the covering layer is more preferably 1 μm or more, and particularly preferably 3 μm or more.

As one aspect of the present embodiment, as shown in FIG. 4, the positive composite layer 31 may contain, as the positive active material particles 40, the large-diameter active material particles 41 and the small-diameter active material particles 42 having the particle size (D30) smaller than the particle size (D30) of the large-diameter active material particles 41. In this aspect, the particle size (D30) of the small-diameter active material particles 42 is used as the particle size (D30) of the positive active material, and is equal to or smaller than the particle size (D50) of the filler particles 43.

As the positive active material particles 40, the large-diameter active material particles 41 and the small-diameter active material particles 42 are mixed, and the small-diameter active material particles 42 enter voids between the large-diameter active material particles 41, so that entry of the filler particles 43 into the positive composite layer 31 is suppressed. As a result, an increase in a DC resistance value of the positive electrode plate 18 can be further suppressed without lowering the permeability of the electrolyte solution into the positive composite layer 31, which is preferable.

In this aspect, the particle size (D30) of the large-diameter active material particles 41 is preferably 1 μm to 30 μm, more preferably 3 μm to 20 μm, and particularly preferably 5 μm to 10 μm. The particle size (D30) of the small-diameter active material particles 42 is preferably 0.1 μm to 15 μm, more preferably 0.5 μm to 10 μm, and particularly preferably 1 μm to 4 μm.

Here, the fact that the positive composite layer contains a plurality of active material particles having different particle sizes can be determined by the presence of a plurality of distribution maximum points when the result of the laser diffraction type particle size distribution measurement is represented by a frequency distribution graph (a graph in which the horizontal axis represents the particle size and the vertical axis represents frequency). When the positive composite layer contains active material particles having a plurality of particle sizes, the value of D30 calculated from data on the side with the smallest particle size at the maximum point in the frequency distribution graph is used as the particle size (D30) of the small-diameter active material particles 42. On the other hand, the value of D30 calculated from data on the side with a large particle size at the maximum point in the frequency distribution graph is used as the particle size (D30) of the large-diameter active material particles 41. When peaks of the frequency distribution of a plurality of particle sizes overlap, an average particle size of the particles is calculated by SEM observation, and the peaks are separated by regarding the average particle size of the particles as the particle size D50 of each particle, so that the particle size (D30) of the small-diameter active material particles 42 and the particle size (D30) of the large-diameter active material particles 41 can be measured.

When a ratio (small-diameter active material particle size D30/large-diameter active material particle size D30) of the particle size (D30) of the small-diameter active material particles 42 to the particle size (D30) of the large-diameter active material particles 41 is 0.9 or less, the small-diameter active material particles 42 efficiently enter the voids between the large-diameter active material particles 41, so that gaps between the active material particles can be reduced. This is preferable because entry of the filler particles 43 into the positive composite layer 31 is further suppressed. Since active material density in the positive composite layer is improved, it is preferable from the viewpoint of improving the energy density of the energy storage device. The ratio is more preferably 0.5 or less, and particularly preferably 0.2 or less. On the other hand, if the particle size of the small-diameter active material particles 42 is too small compared to the large-diameter active material particles 41, a gap is generated between the large-diameter active material particles 41, so that the ratio (small-diameter active material particle size D30/large-diameter active material particle size D30) of the particle size (D30) of the small-diameter active material particles 42 to the particle size (D30) of the large-diameter active material particles 41 is preferably 0.1 or more.

(Process of Manufacturing Energy Storage Element 20)

Next, an example of a process of manufacturing the energy storage element 20 will be described. The process of manufacturing the energy storage element 20 is not limited to the following description.

The positive composite layer 31 is applied to one or both surfaces of the positive electrode current collecting substrate 30 having a predetermined width dimension. The positive composite layer 31 can be applied by a known method such as a blade, a knife, a die nozzle or the like. The applied positive composite layer 31 may be formed to have a predetermined thickness dimension by pressing with a press or a roller. If the thickness dimension of the positive composite layer 31 can be sufficiently set at the time of application, the pressing step may be omitted.

Subsequently the covering layer 44 is applied to the surface of the positive composite layer 31. As described above, since the positive composite layer 31 is applied to both surfaces of the positive electrode current collecting substrate 30, the covering layer 44 is applied to the surface of the positive composite layer 31 applied to each surface of the positive electrode current collecting substrate 30.

The covering layer 44 can be applied by wet coating in which a slurry containing a solvent is applied, or by dry coating without using a solvent as described later in Examples. The dry coating is a method in which a powder obtained by mixing filler particles and binder particles, or a powder obtained by compounding binder particles on the surface of filler particles is sprayed (sprinkled) from above the positive composite layer 31 using various feeders such as an air flow feeder and a vibration feeder to be heated, and thus to form a covering layer on the surface of the positive composite layer 31. Here, the wet coating is coating without using a solvent.

When the dry coating is used, it is possible to prevent the filler particles from flowing into the positive active material layer together with the solvent, so that it is considered that the permeability of the electrolyte solution into the positive active material layer is kept good. Thus, a positive electrode plate having a covering layer formed by dry coating is more preferable than a positive electrode plate having a covering layer formed by wet coating because the effect of suppressing an increase in DC resistance is higher. During spraying, the filler particles can be uniformly applied by spraying the filler particles charged by static electricity. This is preferable because thickness of an insulating layer can be reduced.

The applied covering layer 44 may be formed to have a predetermined thickness dimension by pressing with a press or a roller. If the thickness dimension of the covering layer 44 can be sufficiently set at the time of application, the pressing step may be omitted.

On the other hand, the negative composite layer is applied to one or both surfaces of the negative electrode current collecting substrate having a predetermined width dimension. The negative composite layer can be applied by a known method such as a blade, a knife, a die nozzle or the like. The applied negative composite layer may be formed to have a predetermined thickness dimension by pressing with a press or a roller. If the thickness dimension of the negative composite layer can be sufficiently set at the time of application, the pressing step may be omitted.

The energy storage element 20 is manufactured by winding the positive electrode plate 18, the separator 21, and the negative electrode plate 19 produced as described above with the separator 21 interposed between the electrode plates.

Hereinafter, the present invention will be described in detail based on Examples. The present invention is not limited by the following examples.

Example 1

(Positive Composite Layer)

A positive electrode paste was produced using a lithium transition metal composite oxide ($LiNi_{1/3}Co_{1/3}Mn_{1/3}O_2$) with a particle size (D30) of 3 μm, which is a positive active material, a lithium transition metal composite oxide ($LiMn_2O_4$) with a particle size (D30) of 17 μm, acetylene black (AB) as a conductive agent, polyvinylidene fluoride (PVDF) as a binder, and N-methylpyrrolidone (NMP) as a nonaqueous solvent. Here, a 12% NMP solution was used as the PVDF. A mass ratio of the positive active material, the binder, and the conductive agent was 93:4:3 (solid content conversion). The positive electrode paste was intermittently applied to both sides of a 15 μm aluminum foil except for an unapplied portion (a region where no positive composite layer was formed), dried, and roll-pressed to prepare a positive composite layer.

(Covering Layer)

Composite filler particles in which polyvinylidene fluoride (PVDF) adheres to the surface of alumina particles were prepared by mixing alumina having a particle size (D50) of 3 μm, which is a filler particle, with PVDF at a mass ratio of 90:10 by mechanofusion. After the composite filler particles were charged, a covering layer was prepared by dry coating in which the composite filler particles were sprayed onto the positive composite layer and heated. The thickness of the positive electrode was 193 μm, and the thickness of the covering layer per one side was 5 μm. The thickness of the covering layer was measured by SEM observation of a cross section of the positive electrode described later.

(Negative Electrode)

Lithium metal foils having a thickness of 300 μm were bonded to both sides of a stainless steel (product name: SUS316) mesh current collector to which stainless steel (product name: SUS316) terminals were attached, and the laminate was pressed and used as a counter electrode.

(Reference Electrode)

A lithium metal piece was bonded to a tip of a current collecting rod made of stainless steel (product name: SUS316) and used as a reference electrode.

(Nonaqueous Electrolyte)

Lithium perchlorate ($LiClO_4$) was dissolved in a solvent in which ethylene carbonate and diethyl carbonate were mixed at 50% by volume and 50% by volume, respectively so that a salt concentration was 1.0 mol/L, and a nonaqueous electrolyte was prepared. The water content in the nonaqueous electrolyte was set to 20 ppm or less.

(Assembly of Lithium Ion Battery)

A lithium ion battery made of glass was assembled in an Ar box having a dew point of −40° C. or lower. One positive electrode, one negative electrode, and one reference electrode each of which was cut so as to have the same area as the counter electrode were inserted into gold-plated clips having a conductor previously fixed to a case cover, and they were fixed such that the positive and negative electrodes faced each other. The reference electrode was fixed to a position behind the electrode as seen from the counter electrode. Next, a cup made of polypropylene containing a certain amount of an electrolyte was placed in a glass case. The case was then covered in such a manner that the positive electrode, the negative electrode, and the reference electrode were immersed in the electrolyte, thereby assembling a lithium ion battery.

Example 2

In the dry coating of the covering layer, a covering layer in which the spray amount with respect to the positive composite layer was changed was prepared. The thickness of the positive electrode having the covering layer was 193 μm, and the thickness of the covering layer per one side was 10 μm. The thickness of the covering layer was measured by SEM observation of a cross section of the positive electrode described later. A battery of Example 2 was produced in the same manner as in Example 1, except that the positive electrode produced as described above was used.

Example 3

(Covering Layer)

A covering layer paste was prepared using alumina having a particle size (D50) of 3 μm, which is a filler particle, polyvinylidene fluoride (PVDF), and N-methylpyrrolidone (NMP) as a nonaqueous solvent. Here, a 12% NMP solution was used as the PVDF. The mass ratio of alumina to PVDF was 94:6 (solid content conversion). A covering layer was prepared by wet coating in which the covering layer paste was applied onto the positive composite layer and dried, and a positive electrode was obtained. The thickness of the positive electrode was 194 μm, and the thickness of the covering layer per one side was 10 μm. The thickness of the covering layer was measured by SEM observation of a cross section of the positive electrode described later. A battery of Example 3 was produced in the same manner as in Example 1, except that the positive electrode produced as described above was used.

Comparative Example 1

(Positive Composite Layer)
A positive electrode paste was produced using a lithium transition metal composite oxide (LiNi$_{1/3}$Co$_{1/3}$Mn$_{1/3}$O$_2$) with a particle size (D30) of 12 µm, which is a positive active material particle, a lithium transition metal composite oxide (LiMn$_2$O$_4$) with a particle size (D30) of 17 µm, acetylene black (AB) as a conductive agent, polyvinylidene fluoride (PVDF) as a binder, and N-methylpyrrolidone (NMP) as a nonaqueous solvent. Here, a 12% NMP solution was used as the PVDF. The mass ratio of the positive active material, the binder, and the conductive agent was 94:3:3 (solid content conversion). The positive electrode paste was applied to both sides of a 15 µm aluminum foil, dried, and roll-pressed to prepare a positive composite layer.
(Covering Layer)
A covering layer was prepared in the same manner as in Example 2. The thickness of the positive electrode was 152 µm, and the thickness of the covering layer per one side was 12 µm. The thickness of the covering layer was measured by SEM observation of a cross section of the positive electrode described later.

Comparative Example 2

A battery of Comparative Example 2 was produced in the same manner as in Example 1, except that no covering layer was prepared and the thickness of the positive electrode was 184 µm.

Comparative Example 3

A battery of Comparative Example 3 was produced in the same manner as in Example 1, except that no covering layer was prepared and the thickness of the positive electrode was 131 µm.
(SEM Observation of Cross Section of Positive Electrode)
For the positive electrodes of Examples 1 to 3 and Comparative Example 1, a portion where the covering layer was formed (excluding an end of the electrode plate) was cut out, and a cross-section portion subjected to cross-section processing by a cross-section polisher or the like was observed with a scanning electron microscope (SEM) (apparatus name: JSM-7001F (manufactured by JEOL Ltd.)). As the observation conditions, the acceleration voltage was 1 kV, and the magnification was 2000 times. The thickness of the covering layer at two places was observed for each positive electrode, and an average value of the thicknesses was defined as the thickness of each positive electrode covering layer.
(Evaluation of Insulating Properties of Electrode Plate)
For the positive electrodes of Examples 1 and 2 and Comparative Example 1, a two-point probe of a resistivity meter (Loresta-EP MCP-T360 manufactured by Mitsubishi Chemical Analytech Co., Ltd.) was pressed against a portion where the covering layer was formed excluding the end of the electrode plate, and a surface resistance value of the positive electrode was measured.
(DC Resistance Measurement)
After capacity measurement, the batteries of Examples 1 to 3 and Comparative Example 2 were subjected to constant current-constant voltage charging at a current value of 0.2 CA and a voltage of 4.2 V for a charging time of 10 hours. After that, a test was performed in which a constant current was discharged to a final voltage of 3.0 V at each rate of discharge current. Specifically, first, discharging was performed at a current of 0.2 CA, and after a 10-minute pause, constant current-constant voltage charging was performed at a current value of 0.2 CA and a voltage of 4.2 V for a charging time of 10 hours. Then, after a 10-minute pause, discharging was performed at a current of 1 CA, and after a 10-minute pause, constant current-constant voltage charging was performed at a current value of 0.2 CA and a voltage of 4.2 V for a charging time of 10 hours.

In addition to the above 1 CA discharge test, the same discharge test was performed at discharge current values of 2 CA, 3 CA, and 5 CA. The DC resistance value of each battery was calculated by dividing a difference between the voltage before the start of discharge and the voltage 0.1 seconds after the start of discharge by the current value.

For the batteries of Comparative Example 1 and Comparative Example 3, the same charge-discharge test and calculation as described above were performed except that a charge voltage was changed to 4.25 V, and the DC resistance value was calculated. The current value 1 CA is a current value that becomes the same amount of electricity as the nominal capacity of the battery when the battery is energized at a constant current for one hour.
(DC Resistance Increase Rate)
DC resistance increase rates (DCR increase rates) of the batteries of Examples 1 to 3 were calculated by the following formula:

(DC resistance value of Examples 1 to 3–DC resistance value of Comparative Example 2)/DC resistance value of Comparative Example 2×100(%)

The DC resistance increase rate of the battery of Comparative Example 1 was calculated by the following formula:

(DC resistance value of Comparative Example 1–DC resistance value of Comparative Example 3)/DC resistance value of Comparative Example 3×100(%)

Table 1 shows the DC resistance increase rates of the batteries of Examples 1 to 3 and Comparative Example 1 obtained as described above.

TABLE 1

|  | Filler particle size D50 (µm) | Active material particle size D30 (µm) | DCR increase rate (%) due to coating of insulating layer | Insulating properties |
|---|---|---|---|---|
| Example 1 | 3 | 3 | −13.0 | ◯ |
| Example 2 | 3 | 3 | −13.0 | ◯ |
| Example 3 | 3 | 3 | −7.2 | ◯ |
| Comparative Example 1 | 3 | 12 | 14.0 | ◯ |
| Comparative Example 2 | — | 3 | — | — |
| Comparative Example 3 | — | 12 | — | — |

(Insulating Properties)
Regarding the evaluation of the insulating properties, in the measurement of electrode plate surface resistance, a case where the resistance value increased by two digits or more compared to the resistance value of the electrode plate including no covering layer was evaluated as "O". By forming the covering layer, when the surface resistance value of the electrode plate increases by two digits or more, even if the separator is blown, it is possible to suppress a short circuit between the positive electrode plate and the negative electrode plate, and it is thought to contribute to improvement of safety of a lithium ion battery.

<Results and Discussion>

(DC Resistance Increase Rate)

In Examples 1 to 3, the DCR increase rates decreased to −13.0%, −13.0%, and −7.6%, respectively. This is probably because, since the particle size (D50) of the filler particles is the same as the particle size (D30) of the positive active material particles, permeation of the filler particles into the positive electrode plate is suppressed, so that an electrolyte sufficiently permeates the positive electrode plate.

Comparing the DCR increase rates of Examples 2 and 3, the DCR increase rate of Example 2 is smaller, even though the thickness of the covering layer is the same. From this result, it is understood that the effect of suppressing an increase in DC resistance in the covering layer prepared by dry coating is higher than that in the covering layer prepared by wet coating. Thus, it is preferable to form a covering layer by dry coating.

On the other hand, in Comparative Example 1, the DCR increase rate increased to 15.5%. This is probably because, since the particle size (D50) of the filler particles is smaller than the particle size (D30) of the positive active material particles, the filler particles penetrate into the positive electrode plate, so that an electrolyte cannot sufficiently permeate into the positive electrode plate.

(Insulating Properties)

In Examples 1 and 2 in which the covering layer was formed on the surface of the positive composite layer, the evaluation of the insulating properties was "○". This is because, since the covering layer is formed on the surface of the positive composite layer, the surface resistance value of the positive electrode increases compared to a case where the covering layer was not formed on the surface of the positive composite layer. Thereby, even if the separator is blown, a short circuit between the positive electrode and the negative electrode can be suppressed.

Although not described in detail, since the filler particles have penetrated into the positive electrode plate, it is considered that when the covering layer is formed by applying the filler particles, the resistance value is lower than the resistance value set at the design stage. In comparison, in Examples 1 and 2, penetration of the filler particles into the positive electrode plate is suppressed, so that when the covering layer is formed, the surface resistance value set at the design stage can be obtained. It is considered that this improves the safety of the lithium ion battery.

Other Embodiments

The technology disclosed in the present specification is not limited to the embodiments described above and illustrated in the drawings. For example, the following embodiments are also included in the scope of the technology disclosed in the present specification.

(1) In the present embodiment, the configuration is such that the covering layer 44 is formed on the surface of the positive electrode plate 18. However, the configuration is not limited to this, and the configuration may be such that the covering layer 44 is formed on the surface of the negative electrode plate 19.

(2) In the present embodiment, a lithium ion battery is used as the energy storage device 10. However, the energy storage device is not limited to the lithium ion battery and may be a capacitor.

(3) In the present embodiment, the configuration is such that the positive active material particles 40 include two types of active material particles including the large-diameter active material particles 41 and the small-diameter active material particles 42. However, the configuration is not limited to this, and the configuration may be such that the positive active material particles 40 include three or more types of active material particles having different particle sizes.

(4) The energy storage element 20 according to the present embodiment is of a wound type in which the positive electrode plate 18, the separator 21, the negative electrode plate 19, and the separator 21 are stacked in this order and wound. However, the present invention is not limited thereto, and the energy storage element 20 may be of a stacked type in which the positive electrode plate 18, the separator 21, the negative electrode plate 19, and the separator 21 are repeatedly stacked in this order.

DESCRIPTION OF REFERENCE SIGNS

10: Energy storage device
18: Positive electrode plate (electrode plate)
31: Positive composite layer (composite layer)
40: Positive active material particles (active material particles)
43: Filler particles
44: Covering layer

The invention claimed is:

1. An electrode plate comprising;
    a composite layer including active material particles; and
    a covering layer including filler particles stacked on the composite layer,
    wherein the active material particle has a particle size (D30) equal to or smaller than a particle size (D50) of the filler particle, and
    a particle size ratio (active material size diameter (D30)/ filler particle size (D50)) of the particle size (D30) of the active material particle to the particle size (D50) of the filler particle is 0.4 or more and 1 or less.

2. The electrode plate according to claim 1, wherein the active material particle is a positive active material particle.

3. The electrode plate according to claim 1, comprising two or more types of active material particles having different particle sizes D30.

4. An energy storage device comprising the electrode plate according to claim 1.

5. A method for manufacturing the electrode plate according to claim 1, the covering layer comprising a binder, the manufacturing method comprising;
    forming a composite particle in which a binder particle is adhered to a surface of the filler particle; and
    adhering the composite particle to a surface of the composite layer, heating, and dissolving and solidifying the binder to form the covering layer.

6. The electrode plate according to claim 1, wherein a particle size (D50) of the active material particle is bigger than the particle size (D50) of the filler particle.

* * * * *